June 25, 1963　　　J. N. FLANNERY ETAL　　　3,094,885
ROTARY TABLE

Filed Oct. 5, 1959　　　　　　　　　　　　　4 Sheets-Sheet 1

INVENTORS
James N. Flannery
BY Joseph A. Becker

Attorney

June 25, 1963  J. N. FLANNERY ETAL  3,094,885
ROTARY TABLE
Filed Oct. 5, 1959  4 Sheets-Sheet 4

INVENTORS
James N. Flannery
Joseph A. Becker
BY
Eero J. Wutschel
Attorney

United States Patent Office 3,094,885
Patented June 25, 1963

3,094,885
ROTARY TABLE
James N. Flannery, West Allis, and Joseph A. Becker, Greendale, Wis., assignors to Kearney & Trecker Corporation, West Allis, Wis., a corporation of Wisconsin
Filed Oct. 5, 1959, Ser. No. 844,258
17 Claims. (Cl. 74—826)

This invention relates generally to rotary tables and more particularly to an improved rotary table positioning and clamping mechanism operable to elevate the table from its supporting base to render the table freely rotatable and effect precise positioning of the table relative to its supporting base as well as to clamp the table in the precise established position.

A general object of the invention is to provide an improved rotary work supporting table having means for positioning and clamping the table in a predetermined desired position and which is particularly adaptable for use with a machine tool.

Another object of the invention is to provide an improved positioning and clamping mechanism for a rotary work supporting table.

Another object of the invention is to provide an improved mechanical apparatus for elevating a work supporting table relative to its supporting base and which is also operable to lower and clamp the table to its supporting base.

Still another object of the invention is to provide an improved mechanical apparatus for effecting precise positioning of a rotary work supporting table.

A further object of the invention is to provide an improved mechanical apparatus for elevating a rotary work supporting table from its supporting base to render the table freely rotatable thereon, and which is also operable to effect precise positioning of the table relative to its supporting base as well as to return the table to its supporting base and effectively clamp it in the precise established position.

Still another object of the invention is to provide an improved coacting rotary table positioning and clamping mechanism actuated by a single actuator.

Another object of the invention is to provide an improved rotary work supporting table having a system of levers operable by a single actuator to elevate the table from its supporting base, to render the table freely rotatable, as well as to effect precise positioning of the table while the table is elevated and to return and clamp the table in the precise located position to the supporting base, means also being provided to effect a clamping of the peripheral edge to the table.

Another object of the invention is to provide an improved work supporting rotary table having mechanical positioning and clamping mechanism which is positive in operation, relatively simple in construction, capable of being easily assembled and disassembled and which is relatively inexpensive to produce.

According to this invention there is provided an indexible rotary work supporting table having improved mechanism for elevating the table from its base to facilitate its rotation in an indexing movement. After the table has been indexed, the table is precisely positioned in an index position and thereafter lowered and clamped to the supporting base in a precise indexed position. To accomplish these results, a lever is pivotally supported in the base and extends radially outwardly thereof with the lever passing below the table and being coupled to it. The lever is operable when moved in one direction to effect axial movement of the table in a direction to elevate it from the supporting base. As the table is being elevated, a second lever, also pivotally supported within the base and having one end connected to a table locating plunger, is actuated by the first lever to effect withdrawal of the locating plunger from table registry to free the table for an indexing movement in the elevated position. The two levers are coupled together in a manner that by actuating the first lever in a direction to elevate the table from its supporting base the second lever is caused to be operated in a direction to effect withdrawal of the indexing plunger from table registry. After the table has been rotated in an indexing movement, the first lever will be actuated in the opposite direction to cause the table to be lowered toward its supporting base. Operation of the first lever in the opposite direction will also effect operation of the second lever to effect movement of the indexing plunger axially into table registry to precisely locate the table relative to the base in a predetermined desired position. Thereafter, the first lever will act to return the table to the supporting base and to exert a force upon the table to effectively clamp it to the base. A single fluid actuator is provided to actuate the positioning and clamping mechanism for effecting its operation. Auxiliary clamping mechanism has also been provided which acts to apply forces to the periphery of the table for the purpose of counteracting deflecting forces transmitted to the edge of the table during a heavy machining operation.

The foregoing objects of the invention, and others which will become apparent from the following detailed description, may be achieved by means of the exemplifying apparatus depicted in and set forth in the specification in connection with the accompanying drawings, in which:

FIG. 2 is an enlarged detailed view partly in vertical section and partly in elevation illustrating the apparatus shown in FIG. 1 and taken generally along the plane represented by the line 2—2 in FIG. 1, the view showing the positioning and clamping mechanism as well as the table drive transmission;

FIG. 3 is a fragmentary view in horizontal section taken generally along the plane represented by the line 3—3 in FIG. 2;

FIG. 4 is a fragmentary detail view in elevation, as viewed from the left side of the apparatus shown in FIG. 1;

Figure 1:
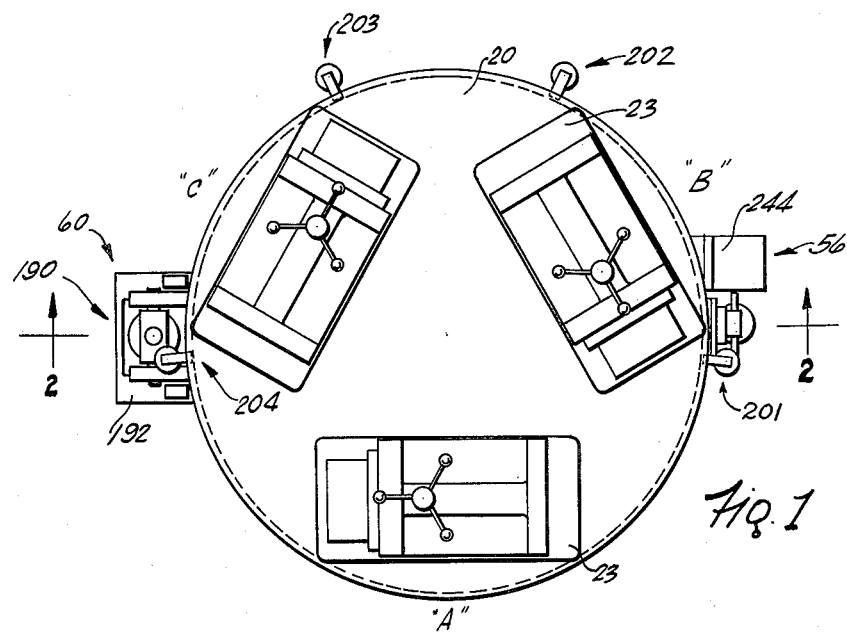
FIGURE 1 is a plan view of a work supporting rotary index table incorporating the features of the present invention.

It is not believed necessary to describe nor show the various machining units surrounding the work supporting table 20, as these uints may be of any desired type and form no part of the present invention. Referring now to FIG. 1, the work supporting table 20 has three stops or stations. The first station, generally indicated by the reference letter "A," is the loading and unloading station wherein the workpieces to be machined are loaded into fixtures 23 and the completed workpieces are removed therefrom. The next two succeeding stops or stations, generally indicated by the reference letters "B" and "C," are designated as work stations since the desired machining operations are performed at these locations upon the workpiece, carried by the work supporting fixtures 23. The fixtures 23 are fixedly secured to the top surface of the work supporting table 20 in equally spaced relationship about the periphery of the table. It is to be understood that while the work supporting table 20 is described herein as having three stations, a greater or lesser number of stations may be employed as may be desired.

The apparatus is entirely automatic, except for the loading and unloading of the workpiece by the operator, and is controlled throughout and synchronized by electrical means, which will be described later, through the use of limit switches and solenoid operated valves. A completely interlocked electrical control circuit is provided to prevent any possibility of damage due to valve failure or carelessness on the part of the operator.

The work supporting table 20 is rotatably carried by a supporting base 21 of circular form corresponding generally to the form of the table 20, and which is shown in FIG. 2 as being secured to the top of a bed 22. As shown in FIG. 2, the table 20 includes a circular apron 26 that overlaps the upper periphery of the base 21. The weight of the table is carried by an outer vertical circular flange 27 of the base 21, the outer surface of which constitutes the periphery of the base. The flange 27 is provided with a top annular bearing surface 28 which is arranged to be engaged by an annular bearing surface 29 formed on the bottom of the table 20.

In order to center the table 20 on the base 21, the base is provided with an inner circular bearing support 32 which extends upwardly from a horizontal web 33 integrally formed in the base and presenting a tapered bore 34. The upper portion of the bore 34 is provided with a counterbore 36 with the top portion thereof being enlarged to form a circular recess 37 for receiving the outer race 42 of an antifriction radial bearing 43. As shown in FIG. 2, the base of the circular recess 37 is relieved to form an annular seat 46 on which the outer race 42 of the bearing 43 is disposed. The arrangement is such that the outer race 42 of the bearing 43 is firmly supported on the annular seat 46 and is restrained from lateral movement by the vertical wall of the circular recess 37. With the base of the recess 37 relieved, the inner race 48 of the bearing 43 is free to rotate relative to the outer race 42. The table 20 is provided with a depending concentric boss or stem 50 that extends downwardly from the undersurface of the table 20. The diameter of the lower end 51 of the boss or stem 50 is reduced for receiving the inner race 48 of the antifriction radial bearing 43.

The base 21 is also formed to provide a compartment, generally indicated by the reference numeral 55, for receiving a compact table indexing mechanism, generally indicated by the reference numeral 56, the operation of which will be subsequently more fully described.

One of the features of the present invention includes a novel mechanical table positioning and clamping mechanism, generally indicated by the reference numeral 60, which is operable to effect precise positioning of the work supporting table 20 in an indexed position and when so positioned, the mechanism is further operable to effect a clamping of the table to its supporting base so that work operations may be performed on the workpieces located at the work stations "B" and "C." Upon completion of the work operations the action of the table positioning and clamping mechanism 60 is reversed and the table is released from clamped engagement with the base, and the table is elevated for raising it off of its support to render it freely rotatable relative to the base for facilitating rotation of the table in an indexing movement. The novel mechanism for accomplishing his operation includes a center post, generally indicated by the reference numeral 59, shown in FIG. 2. The upper end 61 of the center post 59 is disposed within a bore 62 formed in the boss 50 of the table, the axis of the bore 62 being concentric to the axis of the boss 50 and table 20. The center post 59 is secured to the boss 50 by means of cap screws 63, one of which is shown in FIG. 2. The screws 63 extend through suitable openings provided in a radial flange 64 formed on the center post and are threadedly engaged in the axial end of the boss 50. The center post 59 extends downwardly into the bore 34 of the bearing support 32 with the extreme lower end 65 of the center post being of reduced diameter and engaged in a bore 67 formed in a boss 68 provided at the bottom of the bore 34. The axis of the bore 67 is concentric with the axis of the bore 34 and serves as a bearing for the pilot end 65 of the center post 59 to effectively maintain the center post in axial alignment with the axis of the bore 34 during an elevating operation of the table.

To effect axial movement of the table 20 relative to the base 21 for the purpose of elevating the table off of the supporting base to render it freely rotatable relative to the base, or to lower the table to the base and apply a clamping force to the table, there is provided a relatively long actuating lever, generally indicated by the reference numeral 70. The lever 70 extends into the base 21 through a suitable opening 71 provided in the periphery of the base and through suitable aligned openings 72 and 73 provided in the circular bearing support 32.

The openings 72 and 73 provided in the bearing support 32 have substantial vertical dimensions so as to provide adequate clearance for vertical movement of the lever 70. Since the openings 72 and 73 have substantial vertical dimensions the upper portions of the openings 72 and 73 communicate with the enlarged or counterbored portions 36 of the bore 34, while the lower portions of the openings 72 and 73 communicate with the bore 34. With the upper portions of the openings 72 and 73 communicating with the enlarged bore portion 36, the shoulder formed by the bore 34 and the enlarged portion or counterbore 36 is bisected to form a pair of semicircular shelves 74 and 75, as best shown in FIG. 3.

As shown in FIG. 3, the lever 70 comprises a pair of arms 76 and 77 which are rigidly connected together by means of a plurality of transverse webs 78 that are integrally formed with the arms 76 and 77. The inner extending ends 79 and 81 of the arms 76 and 77 respectively, are bifurcated, the construction of the arm 77 being clearly shown in FIG. 2, which construction is complemented in the arm 76. The bifurcated ends, 79 and 81 of the arms 76 and 77 respectively, are engaged on the extending ends 82 and 83 of a shaft 84 that is journalled in a pivot block 85. The pivot block 85 is disposed on a suitable surface 86 formed on the horizontal web 33, the surface 86 also defining the bottom of the opening 73. The pivot block 85 is secured in position on the surface 86 by means of screws 87. The arrangement is such that the lever 70 may be inserted into the base 21 through the opening 71 in the periphery of the base and through the aligned openings 72 and 73 in the bearing support 32 with the bifurcated ends 79 and 81 of the arms 76 and 77 of the lever 70 engaging the extending ends 82 and 83 of the shaft 84 to form a pivot connection about which the lever 70 is movable.

To maintain the lever 70 in operative position within the base 21 with the bifurcated ends 79 and 81 engaged on the extending ends 82 and 83 of the shaft 84 the outwardly extending ends 88 and 89 of the arms 76 and 77 respectively, of the lever 70, are provided with elongated vertical openings 91 and 92 through which a horizontal pin 93 extends. The pin 93 is removably carried by a pair of vertical side plates 94 and 96 that are welded to a rectangular mounting plate 97 which is secured to the periphery of the base 21 by means of screws (not shown), and having an opening 98 which coincides with the opening 71 provided in the periphery of the base 21. With this arrangement the extending end of the lever 70 is movable in a vertical plane about the shaft 84 while the lever is prevented from moving outwardly out of operating position by the pin 93.

The lever 70 is operably connected to the table 20 in a manner that movement of the outwardly extending end of the lever 70 about the shaft 84 in an upward direction, as viewed in FIG. 2, will operate to elevate the table 20 off of the bearing surface 28 to render it freely rotatable in an indexing movement. The lever 70 is also operable, when the extending end thereof is moved downwardly, to return the table to the supporting surface 28 of the base and to exert a force upon the table 20 to effectively clamp it to the supporting bearing surface 28 of the base 21. To effect a coupling of the lever 70 to the table 20 for effecting the axial movement of the table 20 relative to the base 21 an antifriction thrust bearing 106 is disposed about the center post 59 with the upper race 107 thereof being snugly mounted about a circular seating surface 108 formed on the center post and with the upper surface 109 of the race 107 engaged against the undersurface of the radial flange 64. The portion 111 of the center post below the annular seating surface 108 is of reduced diameter so as to provide suitable clearance between the peripheral surface of the center post and the lower race 110 of the bearing 106, so that the upper race 107 is free to rotate relative to the lower race 110.

An upper thrust ring 115 is mounted about the reduced portion 111 of the center post 59 and is disposed to engage the lower surface of the lower race 110 of the bearing 106. The inner diameter of the thrust ring 115 is slightly larger than the diameter of the reduced portion 111 of the center post 59 upon which it is mounted so as to provide for free axial movement of the thrust ring relative to the center post 59. As shown in FIG. 2, a portion 117 of the center post 59 immediately below the reduced portion 111 is further reduced and is provided with threads to threadedly receive a lower thrust ring 118 the upper surface 119 of which engages against a shoulder 120 formed by the reduced portion 111 and the reduced threaded portion 117 of the center post.

To couple the lever 70 to the table 20 for effecting axial movement of the table in either direction, the arms 76 and 77 are each provided with an upper thrust pillow or block 125 and a lower thrust pillow or block 126. The thrust pillows 125 and 126 are identical in size and construction and are mounted on the arms 76 and 77 in the same manner. As shown in FIG. 2, the upper thrust pillow 125 in the arm 77 is disposed in snug engagement in a recess 127 formed in the upper edge of the arm 77, while the lower thrust pillow 126 is snuggly engaged in a recess 128 formed in the lower edge of the arm 77. The upper and lower thrust pillows in the arm 76 are similarly arranged. The thrust pillows 125 and 126 are constructed so that their outer surfaces are of an arcuate configuration, as clearly shown in FIG. 2 and are positioned so that when the lever 70 is in operative position within the base 21 the contact effected between the upper and lower thrust pillows 125 and 126 with the upper and lower thrust rings 115 and 118, respectively, will be substantially line contact and in a vertical plane that is transverse to the longitudinal axis of the lever and also passes through the axis of the center post and bisects the thrust rings and the thrust pillows. In this manner, the upwardly acting forces applied to the upper thrust ring 115 upon upward movement of the extending end of the lever 70 through the upper thrust pillows 125 of the arms 76 and 77, will be exactly the same and the forces will be distributed equally throughout the upper thrust ring 115 and transmitted to the thrust bearing 106 and thence to the table to effect its elevation from the supporting base 21.

In assembling the apparatus the center post 59 is secured in position to the table 20 and the thrust bearing 106 is then mounted on the center post and snuggly fitted on the annular seating surface 108. The upper thrust ring 115 is then mounted on the center post and the lower thrust ring 118 is threadedly engaged on the threaded portion 117 of the center post. With the radial bearing 43 disposed within the recess 37, the table 20 is mounted on the base 21 with the pilot end 65 of the center post 59 disposed within the bore 67. Since, as clearly shown in FIG. 2, the outside diameter of the upper thrust ring 115 is larger than the diameter of the bore 34 and less than the diameter of the counterbore 36, the upper thrust ring 115 will engage the two semicircular shoulders or shelves 74 and 75, shown in FIG. 3, that have been formed by the counterbore 36 in the bearing support 32. Thus, as the table 20 is lowered to the base 21, the center post 59 will enter the bore 34 and the upper thrust ring will engage and rest upon the semicircular shoulders 74 and 75 to be maintained thereat and effectively prevented from dropping downwardly into the bore 34. With the table mounted on the base in an operative position and with the upper thrust ring 115 resting upon the semicircular shoulders 74 and 75 the spacing between the bottom face 134 of the upper thrust ring 115 and the top face 135 of the lower thrust ring 118 is sufficient to allow the ends 79 and 81 of the arms 76 and 77, respectively, to be inserted between the two thrust rings. When the lever 70 is inserted through the opening 71 of the periphery of the base and through the opening 72 in the bearing support 32 the ends 81 and 79 of the arms of the lever 70 will engage the upper surface 135 of the lower thrust ring 118 and as the lever continues to be moved inwardly, the arms will slide along the upper face 135 of the lower thrust ring until the lower pillow blocks 126 of the arms engage the upper surface 135 of the thrust ring 118. As movement of the lever 70 is continued inwardly the lower thrust pillows 126 will tend to raise the lever 70 while the upper thrust pillows 125 will move the upper thrust ring 115 upwardly into its operative position against the bottom face of the lower race 110 of the bearing 106. The spacing between the lower face 134 of the upper thrust ring 115, with the upper thrust ring 115 in operative position, and the upper face 135 of the lower thrust ring 118 has been predeterminately established so that the upper and lower thrust pillows 125 and 126 will have a sliding fit between the upper thrust ring 115 and the lower thrust ring 118. When the lever 70 is in position, the pin 93 is inserted through the vertical openings 91 and 92 provided in the arms 76 and 77, respectively, to lock the lever 70 in position. It is apparent that the assembling of the mechanism, thus far described, is easily and quickly accomplished in a minimum of time. It is also apparent that when the table 20 has been elevated relative to the base 21 by operation of the lever 70 that the table 20 will be rotatably supported on the thrust bearing 106 while it is being restrained from lateral movement by the radial bearing 43. Thus, the table 20 when in an elevated position, is rendered freely rotatable by the anti-friction bearings to facilitate indexing of the table.

For effecting precise angular positioning of the table relative to the base, the table is provided with a plurality of locating mechanisms 137, one of which is shown in FIG. 2. Since the particular exemplifying apparatus is a three station rotary indexing table, the locating mechanisms 137 are spaced 120° apart and are disposed in the portion of the table which is adjacent to the bearing surface 28 of the base 21. The locating mechanisms 137 are identical and therefore a description of one will pertain to all of the mechanisms that are provided in the table 20. As shown in FIG. 2, the locating mechanisms 137 comprise a plunger receiving cup 141 which is disposed in an opening 138 provided in the table 20. The cup 141 is provided with a radially extending flange 140 which is recessed into a counterbore 139 of the opening 138. The cup 141 is formed with a plunger receiving bore 142 which is operable to receive a vertically movable plunger 148.

Figure 7:
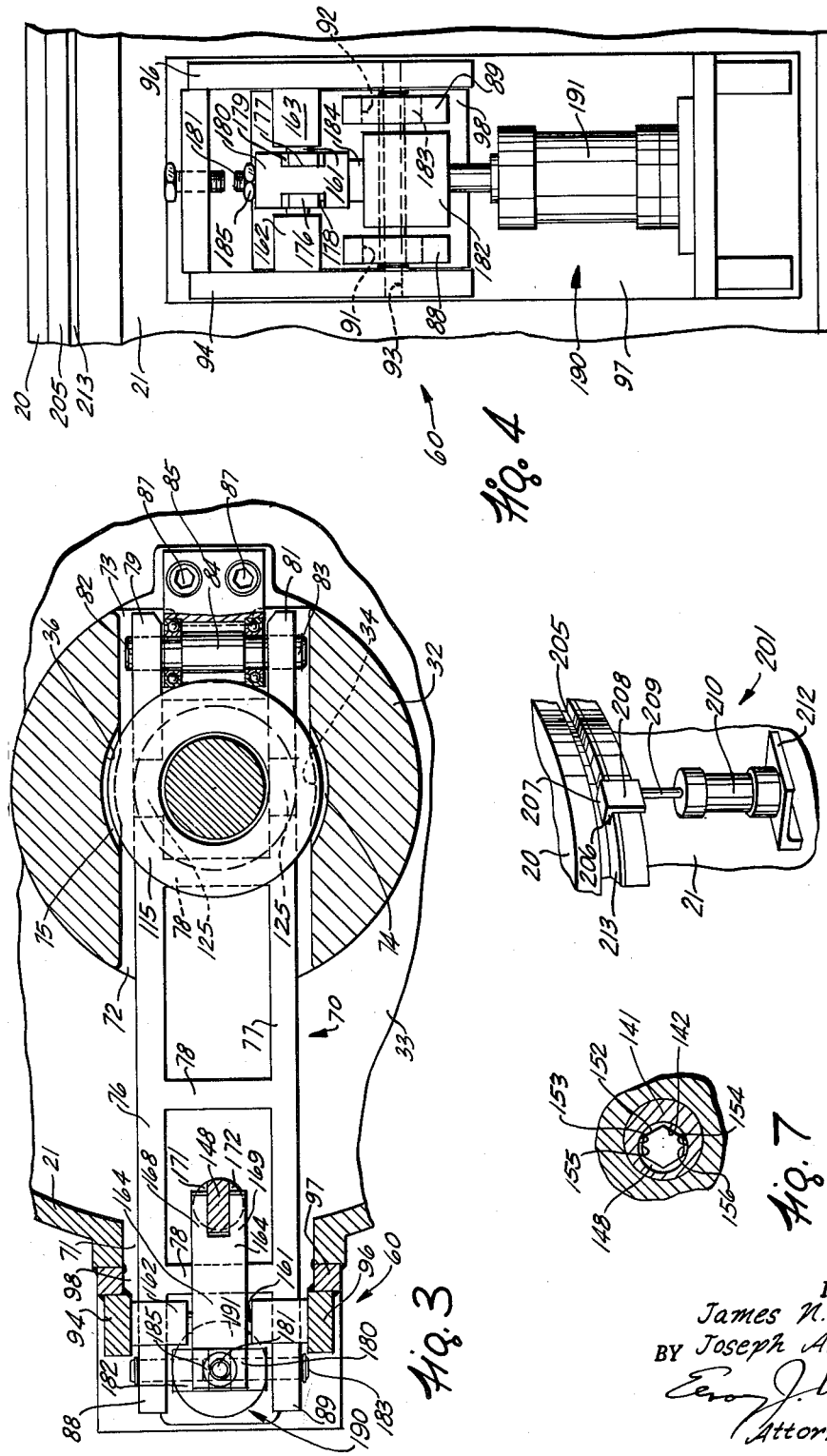
FIG. 7 is a view in horizontal section taken along the plane represented by the line 7—7 in FIG. 2, showing the construction of the upper end of the table positioning plunger.

The inner surface of the periphery of the base is provided with an inwardly extending elongated boss 146 in which a vertical bore 147 is formed to accommodate the plunger 148, as shown in FIG. 2. A bearing sleeve 151 is disposed within the bore 147 of the boss 146 and serves to slidably support the plunger 148 therein for axial movement as it is moved into and out of the bore 142 provided in the cup 141. To facilitate entry of the plunger 148 into the bore 142 of the cup 141 and also to effect precise angular positioning of the table 20 relative to the base, the upper end of the plunger 148 is provided with a nose portion 152 which serves as a pilot for facilitating the entry of the plunger into the bore of the cup. The pilot end 152 of the plunger 148 is formed so that the configuration of the pilot end 152, as viewed from the top and shown in FIG. 7, is substantially diamond shaped and having a major and minor axis with the minor axis being less than the diameter of the plunger 148. The surfaces 153 and 154 at the ends of the major axis of the pilot end 152 of the plunger 148 are formed in an arcuate configuration the radius of which is the same as the radius of the plunger 148. The extreme upper ends 155 and 156 of the arcuate surfaces 153 and 154, respectively, are tapered inwardly toward the axis of the plunger to facilitate the entry of the plunger into the bore 142 of the cup 141. Thus, upon axial movement of the plunger 148 upwardly into registry with the opening or bore 142 of the cup 141, precise angular positioning of the table 20 will be effected relative to the base 21 by operation of the arcuate surfaces 153 and 154 engaging the bore 142 of the cup 141.

Axial movement of the plunger 148 is effected by means of a lever, generally indicated by the reference numeral 160. The level 160 is pivotally supported on a shaft 161 that is journalled in a pair of inwardly extending bosses 162 and 163, shown in FIGS. 3 and 4, that are welded or otherwise secured to the inner surface of the side plates 94 and 96, respectively. The lever 160 is provided with an inwardly extending relatively long arm 164 the extreme inner end of which is bifurcated to form fingers 168 and 169. The fingers 168 and 169 of the arm 164 are engaged in recesses 171 and 172 formed on either side of the plunger 148. The lever 160 is also provided with a second relatively short arm 175 which is also bifurcated to form fingers 176 and 177 which are engaged in recesses 178 and 179, respectively, formed in a coupling sleeve 180. The coupling sleeve 180 is mounted on a stud 181 which is threadedly engaged in a pivot block 182 journalled on a pin 183 that is carried in the outer ends 88 and 89 of the arms 76 and 77, respectively. The axial bottom end face of the coupling sleeve 180 is spaced from the top surface of the pivot block 182 by means of a fitting spacer 184, with the coupling sleeve being maintained in an operative position on the stud 181 by means of a nut 185.

Figure 5:
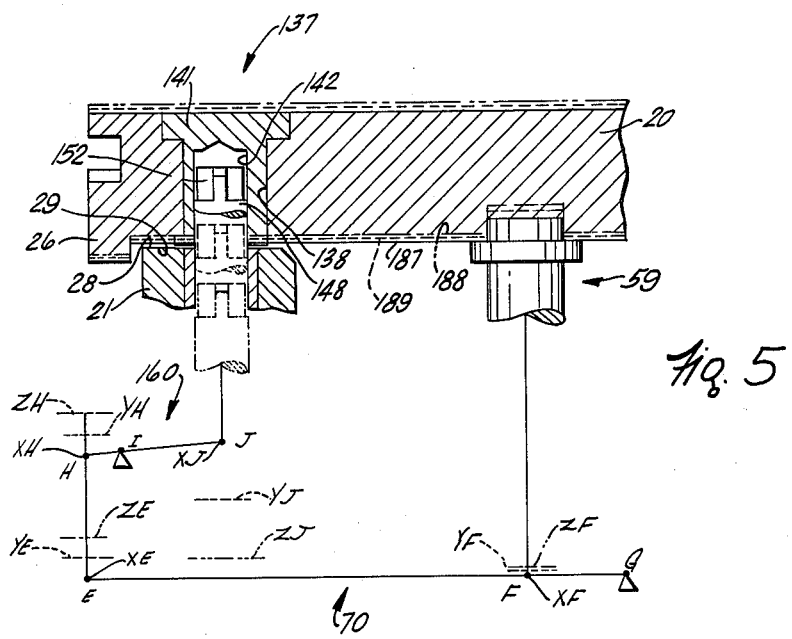
FIG. 5 is a schematic line diagram of the positioning and clamping mechanism of the present invention which illustrates the coordinated movements of the various components of the mechanism.

The operation of the novel positioning and clamping mechanism will be described with reference to FIG. 5, wherein a schematic representation is made of the various component members to clearly show the function of the several movements of the various members. As shown in FIG. 5, point "E" represents a point at which the axis of the lever 70 and the axis of the stud 181 intersects; point "F" represents a point at which the axis of the lever 70 and the axis of the center post 59 intersect; point "G" represents a point about which the axis of the lever 70 is pivotably movable corresponding to the axis of the pin 84; point "H" represents a point at which the axis of the lever 160 and the axis of the stud 181 intersect; point "I" represents a point about which the axis of the lever 160 is pivotably movable corresponding to the axis of the pin 161; and, point "J" represents a point at which the axis of the plunger 148 and the axis of the lever 160 intersect. The positions of the various points, as shown in FIG. 5, are the positions that these points are in when the plunger 148 is in full registry with the bore 142 of the plunger cup 141 to precisely locate the table relative to the base and with the table resting on the bearing surface 28 of the base 21 and clamped thereto. Under these conditions point "E" will be located at a position "XE," point "F" will be at a position "XF," point "H" will be at a position "XH" and point "J" will be at a position "XJ." The end 152 of the plunger 148 will be positioned within the bore 142 of the cup 141, as shown in full lines in FIG. 5.

It is to be understood that the showing made in FIG. 5 is schematic only and that the ratio of the horizontal dimension relative to the vertical dimensions have been greatly reduced in order to clearly show the various positions of the plunger 148 and the related table positions.

Assuming now that it is desired to effect an indexing movement of the table 20 relative to the base 21, the outwardly extending end of the lever 70 is caused to be moved upwardly so that the lever 70 will pivot about the point "G" and moving point "E" from the position "XE" to a position "ZE." Since point "F" is a point on the axis of the lever 70 it will move upwardly from a position "XF" to a position "ZF" which distance is less than the distance between the position "XE" and the position "ZE" to which point "E" is moved. Since the table 20 will move with point "F" the same amount and in the same direction the bearing surface 29 will move upwardly relative to the bearing surface 28 of the base 21 from its clamp position indicated by the solid line 187 to a position indicated by the dot and dash line 188. In this position the table 20 will be fully elevated and rotatably supported on the thrust bearing 106 to render it freely rotatable.

As point "E" moves from the position "XE" to position "ZE" point "H" will be caused to move a like amount from the position "XH" to the position "ZH." As point "H" moves to the position "ZH" the lever 160 will pivot about the point "I" causing the point "J" to move from the position "XJ" downwardly to the position "ZJ." Since the distance between point "H" and the pivot point "I" is substantially less than the distance between the pivot point "I" and the point "J," point "J" will move downwardly a greater distance in moving from position "XJ" to the position "ZJ" then point "H" moves upwardly in moving from the position "XH" to the position "ZH." Due to the interconnection between the arm 164 of the lever 160 and the plunger 148 the plunger will be moved downwardly a distance equal to the distance that point "J" moves downwardly and therefore will move from the position shown in full lines to the position shown in the dot and dash lines. When the plunger 148 is in the position indicated by the dot and dash lines the tapered end of the pilot end 152 of the plunger 148 will be completely disengaged from the bore 142 of the cup 141 to free the table 20 for an index movement relative to the base 21.

With the table in an elevated position and the plunger disengaged, an indexing movement of the table may be effected with the table being rotatably supported on the thrust bearing 106 and restrained from lateral movement by means of the radial bearing 43. After an index movement of the table 20 has been effected or just prior to the completion of the indexing movement, the outward extending end of the lever 70 is caused to be moved downwardly moving point "E" from the position "ZE" to the position "YE." This reverse movement of point "E" will also effect reverse movement of point "F" from the position "ZF" to the position "YF" in which position the table will have been lowered from its elevated position represented by the dot and dash line 188 to a position between the lines 187 and 188 and represented by the dotted line 189 to provide a slight amount of clearance between the bearing surface 29 of the table and the bearing surface 28 of the base so that the table 20 is still rotatably supported on the thrust bearing 106. As point "E" moves from the position "ZE" to the position "YE" point "H" will be caused to move a like amount and will move from the position "ZH" to the position "YH" thereby effecting upward movement of point "J" from the position "ZJ" to the position "YJ" which effects upward axial movement of the plunger 148 to move it from the position shown in the dot and dash lines to the position represented by the dotted lines. When the plunger 148 has moved to the position shown in dotted lines the pilot end 152 of the plunger 148 will have been engaged in the bore 142 of the cup 141 to effect precise angular positioning of the table 20 relative to the base 21.

In the event that the table 20, in being moved in an indexing movement has not stopped in the exact index position but is displaced slightly from the desired position, the entrance of the pilot end 152 of the plunger 148 will operate to correct any positioning error that may have occurred. This is true by reason of the fact that when the plunger 148 is moved axially into registry in the bore 142 of the cup 141, the table 20 is still slightly elevated relative to the base 21. The tapered surfaces 155 and 156 on the pilot end of the plunger 148 will facilitate the entry of the plunger into the bore 142 of the cup 141 and as the plunger 148 is moved further into the bore 142 the arcuate surfaces 153 and 154 will engage the bore 142 and actually shift the table one way or the other as the case may be, to effect precise angular positioning of the table 20 while it is still elevated relative to the base 21.

As downward movement of the extending end of the lever 70 is continued, the point "E" will move from the position "YE" to its original position "XE," the point "F" will move from the position "YF" to the position "XF" and the table 20 will move from the position represented by dotted line 189 to the position represented by the full line 187. In these positions the table 20 will be supported on the bearing surface 28 of the base 21 and the lever 70 will be exerting a force upon the table to clamp the table in the desired index position as established by the plunger 148. In being moved downwardly so as to return point "E" to the position "XE" the lever 70 will also effect movement of point "H" to move it from the position "YH" to its original position "XH" and thereby effect movement of point "J" from the position "YJ" to the position "XJ." Thus, the plunger 148 will move upwardly further into the bore 142 of the cup 141 from its table locating position represented by the dotted lines to an overtravel position represented by the full lines.

From the foregoing description of the operation of the table positioning and clamping mechanism 60, it is apparent that the mechanism is operable to effect precise positioning of the table 20. Since the mechanism 60 can precisely position the table 20 relative to the base 21 it will also operate to hold the table in the precise position and prevent minute shifting of the table when clamping takes place.

With the present invention it is apparent that a completely mechanical mechanism has been provided which is operable to precisely locate a work supporting table in an index position and when the table has been so located to effect a clamping of the table to its supporting base. It is also apparent that with the present mechanism the table 20 is maintained in an elevated position relative to the base by the lever 70 and the locating plunger 148 is moved to a position free and clear of the table so that it does not interfere with the rotation of the table as it is moved in an indexing movement, nor can the table, upon being driven in an indexing movement, impart a force to the plunger which might tend to damage and impair the efficiency and operation of the positioning and clamping mechanism. Also, the table when in an elevated condition is restrained from lateral movement by means of the radial bearing 43 and is rotatably supported on the thrust bearing 106 to render the table freely rotatable for facilitating indexing of the table. As soon as the locating plunger is made to register in an opening to effect precise positioning of the table, the lever 70 operates to effect lowering of the table to the supporting base and to apply a clamping force to the table to effectively clamp the table in a precise index position.

Figures 8, 9:
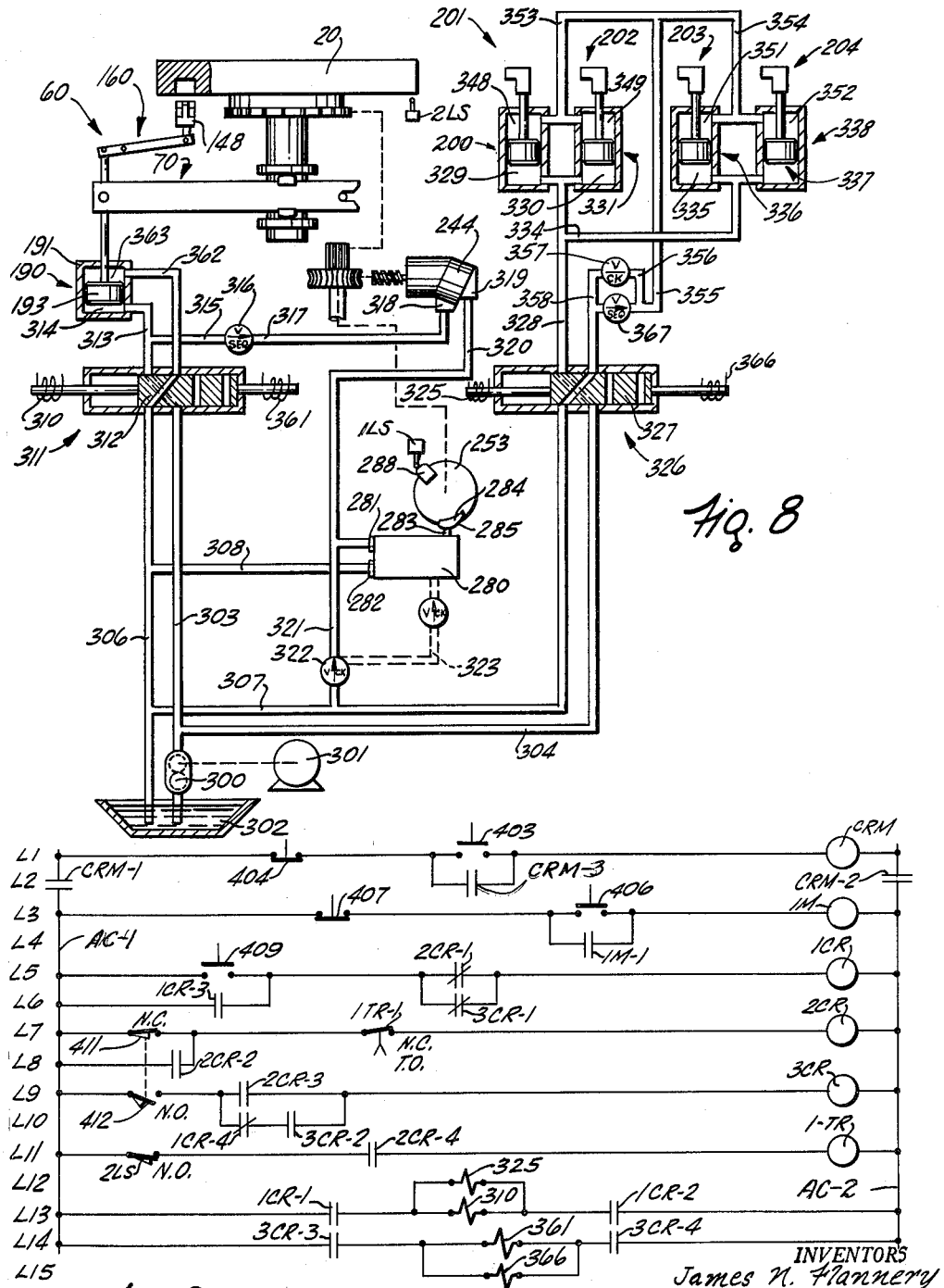
FIG. 8 is a diagrammatic view of the hydraulic circuit of the apparatus.
FIG. 9 is an electrical wiring diagram illustrating the control circuit for controlling the operation of the various components.

Operation of the positioning and clamping mechanism 60 is effected by means of a single fluid actuator, generally indicated by the reference numeral 190, shown in FIGS. 2, 4 and 8. The fluid actuator 190, comprises a cylinder 191 which is disposed and secured in a vertical position on a supporting bracket 192 that is welded or otherwise secured to the outer periphery of the base 21, as shown in FIGS. 2 and 4. A piston 193, shown diagrammatically in FIG. 8, is reciprocably supported within the cylinder 191 and is provided with a piston rod 194 which extends outwardly of the cylinder to threadedly engage in a suitable threaded opening provided in the undersurface of the pivot block 182. Thus, energization of the fluid actuator 190 in a direction to effect upward movement of the piston rod 194 will operate to effect upward movement of the end of the lever arm 70 and will also effect upward movement of the arm 175 of the lever 160 in the same amount. As the outwardly extending end of the lever 70 moves upwardly the upper thrust blocks 125 engage the undersurface of the thrust ring 115 which acts through the thrust bearing 106 and the radial flange 64 of the center post 59 to effect upward movement of the table a distance which is less than the distance that the outwardly extending end of the lever 70 moves upwardly. Since the relatively short arm 175 of the lever 160 will move the same distance as the end of the elever 70 moves, it effects pivotal movement of the lever 160 in a clockwise direction about the pin 161 to thereby effect downward movement of the arm 164 of the lever 160. The end of the arm 164 will move downwardly a distance which is greater than the distance that the end of the arm 175 of the lever 160 moves upwardly. Therefore, by reason of the connection between the arm 164 and the locating plunger 148, the plunger will be caused to move downwardly with the end of the arm 164 an equal amount.

On the other hand, with the table 20 in an elevated position, and the locating plunger 148 out of table registry, energization of the fluid actuator 190 to effect downward movement of its piston rod 194 will operate to effect downward movement of the outwardly extending end of the lever 70, and by virtue of the interconnection between the lever 70 and lever 160 will also cause the arm 175 of the lever 160 to move downwardly the same amount. The arm 164 of the lever 160 will therefore be caused to move upwardly and effect like movement of the locating plunger 148 to engage the pilot end 152 into registry with the bore 142 of the cup 141 and thereby effect precise angular positioning of the table relative to the base. At this time the table 20 is still in an elevated position relative to the base 21 but it has now been precisely angularly located by operation of the plunger 148. Thereupon, further downward movement of the outer end of the lever 70 will operate to lower the table to the base and as this occurs, the plunger 148 will be moved further into the bore 142 to permit the lever 70 to apply a force to the table through the lower thrust ring 118 to effectively clamp the table to the supporting surface 28 of the base 21. It is important that the relationship between the axial movement of the table 20 and the axial movement of the plunger 148 must be maintained in a proper relationship so that the plunger 148 may be made to register with the table prior to the lowering of the table to the base. This is true by reason of the fact that the plunger 148 operates to effect precise positioning of the table 20 to an index position. To accomplish this result the plunger 148 must be made to enter the bore 142 of the cup 141 while the table 20 is still slightly elevated relative to the base 21. With the table 20 elevated relative to the base 21 the plunger 148 will actually shift the table in its rotary movement in the event the table has failed to stop at its exact index position. This is possible because when the table 20 is in an elevated position relative to the base 21 it is supported on the thrust bearing 106 which renders the table freely rotatable and at this time the plunger 148, when moved into the bore 142 of the cup 141, can easily shift the table into a precise index position. The proper relationship between the axial movement of the table 20 and the axial movement of the plunger 148 may be established by changing the height of the fitting spacer 184. Thus, by increasing the height of the fitting spacer 184 the depth of engagement of the pilot end 152 of the locating plunger 148 will be somewhat less than presently shown in FIG. 2. Therefore, when the plunger is moved into engagement with the opening 142 the pilot end 152 thereof will enter the bore 142 of the cup 141 at a time somewhat later with respect to the movement of the table than it would with the dimensional relationship shown in FIG. 2. On the other hand, if the height of the fitting spacer 184 is less than shown, the pilot end 152 of the plunger 148 will be engaged further into the bore 142 of the cup 141 and, therefore, in a table positioning action would be made to register with the bore 142 when the table 20 is in a higher position than it would with the dimension shown in the drawings.

Figure 6:
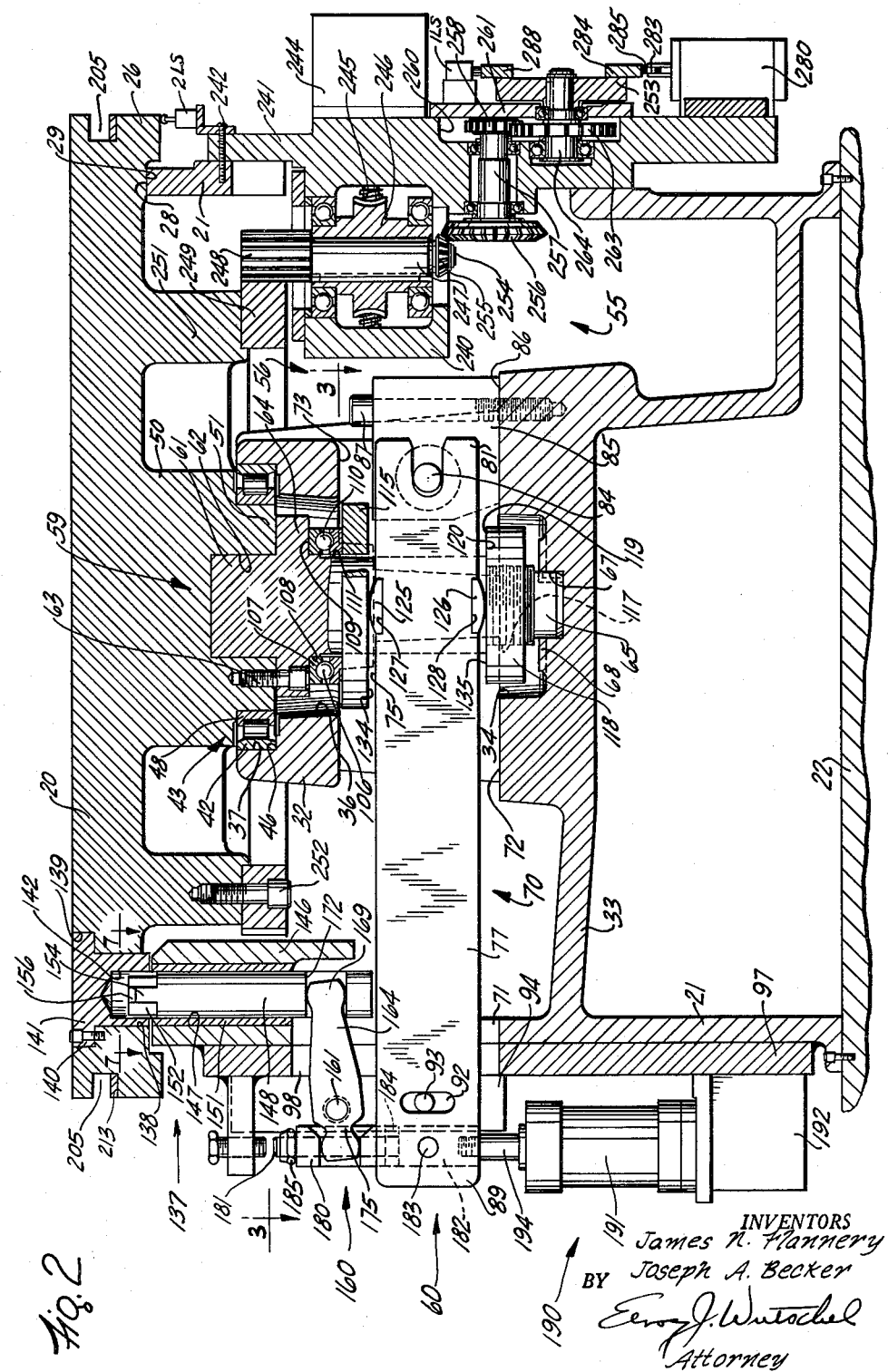
FIG. 6 is an enlarged elevational view of one of the auxiliary clamp mechanisms.

Auxiliary clamp mechanisms, generally indicated by reference numerals 201, 202, 203 and 204 have been provided to prevent upward deflection of the table edge, adjacent to the work stations "B" and "C," during a work operation. As shown in FIG. 1, the auxiliary clamp mechanisms 201, 202, 203 and 204 are positioned about the peripheral edge of the table at points on either side of the work stations "B" and "C." The auxiliary clamp mechanisms are identical in construction and operation and, therefore, the description of the clamp mechanism 201 will apply to all. As shown in FIGS. 2 and 6, the peripheral edge of the table 20 is provided with an annular groove 205 which receives a short leg 206 of an L-shaped clamp member 207. A long leg 208 of the clamp member 207 is secured to the extending end of a piston rod 209. The piston rod 209 extends inwardly into a cylinder 210 and is secured to a piston that is reciprocably supported therein. The cylinder 210 is supported and secured in operative position to a bracket 212 that is securely fastened to the periphery of the base 21.

Operation of the auxiliary clamp mechanisms 201, 202, 203 and 204 in a clamping action is effected after the table 20 has been precisely positioned in an index position and clamped in the desired index position by the operation of the positioning and clamping mechanism 60. The several auxiliary clamp mechanisms, when operated in the clamping action, operate to move their associated clamp members 207 downwardly so that the short leg portion 206 of the clamp members engages against a hardened steel bearing pad 213 that is fabricated in sections and secured to the bottom surface of the annular groove 205. The clamp mechanisms, when so operated, act to apply a downwardly acting force to the peripheral edge of the table 20 that counteracts any tendency of the peripheral edge of the table to deflect upwardly during a work operation.

The compact indexing mechanism 56, which is disposed within the compartment 55 formed in the base 21, as previously described, is operable to rotate the table 20 in an indexing movement. The indexing mechanism 56, as shown in FIG. 2, comprises a gear box 240 which has a face plate 241 integrally formed with it. The gear box 240 is designed to fit within the compartment 55 and is secured in position to the base 21 by means of bolts 242, one of which is shown, which are inserted through the face plate 241 and threadedly engaged in the base 21. The arrangement is such that the index mechanism 56 is easily and quickly removable from the machine by removing the screws 242 and sliding the indexing mechanism 56 as a unit out of the compartment 55. With this arrangement, any maintenance that is required by the indexing unit will be accomplished in the shortest period of time.

A hydraulic motor 244 is secured to the face plate 241 by means of screws (not shown). The motor 244 is provided with a drive shaft (not shown) that extends through a suitable opening (not shown) provided in the face plate 241 and has its extending end operatively connected to drive a worm drive shaft 245 that is journalled in the casing 240. The worm drive shaft 245, as shown in FIG. 2, meshes with a worm gear 246 that is mounted on and keyed to a vertically disposed table drive pinion shaft 247 that is journalled in the gear box 240. The pinion drive shaft 247 has its upper end extending through the top of the casing 240 and has integrally formed thereon a relatively large pinion 248 that is disposed to mesh and drive a table driving gear 249 for effecting rotation of the table 20 in an indexing movement. The ring or table drive gear 249 is secured to the bottom surface of a circular depending flange that is formed intermediate the peripheral edge of the table and the stem 50. The ring gear 249 is mounted on the flange 251 so that it is concentric to the table 20 and is secured to the flange by a plurality of screws 252, one of which is shown.

The indexing movement of the table 20 as it approaches an index position and the sequencing of the table positioning and clamping mechanism 60 as well as the operation of the auxiliary clamp mechanisms 201, 202, 203 and 204, is controlled by means of a control plate 253 which is driven by the hydraulic motor 244 at a predetermined ratio relative to the rotation of the table 20. To effect a driving connection between the motor 244 and the control plate 253, the drive shaft 247 extends downwardly through a suitable opening provided in the gear case 240 with the extending end 254 of the drive shaft 247 being provided with a bevel gear 255 that is secured thereto for rotation with the shaft 247. The bevel gear 255 is disposed in meshing engagement with a larger bevel gear 256 that is integrally formed on a horizontal short shaft 257 that is journalled in a suitable bore provided in the face plate 241. The outwardly extending end of the shaft 257 has secured to it a relatively small change gear 258 that is removably secured to the shaft 257 for rotation with it. The change gear 258 is positioned within a change gear compartment 260 that is formed in the face plate 241 and which is closed by means of a cover plate 261. The change gear 258 meshes with a larger change gear 263 that is mounted on a control plate drive shaft 264 journalled in the face plate 241 and the cover plate 261. An end of the control plate drive shaft 264 extends outwardly of the cover plate 261 and receives the control plate 253 which is keyed thereto so as to rotate with the shaft 264. Since the apparatus in which the present invention is incorporated is a three station rotary indexing table, the ratio of rotation between the table 20 and the control plate 253 is such that the control plate 253 will revolve 360° for each 120° of indexing movement of the table 20. This ratio is achieved by means of the change gears 258 and 263. It is apparent therefore that by removing the control plate 253 and the cover plate 261, the change gears 258 and 263 may be conveniently changed and other gears having different ratios substituted therefor in order to effect a greater or lesser number of indexes of the table 20 as may be desired.

To control the rate at which the table 20 will approach an index position, and also to stop the driving motor 244 when the table has reached an approximate index position, a deceleration valve 280, shown in FIGS. 2 and 8, having an inlet port 281 and an outlet port 282 and a passage closing plunger 283, is secured to the face plate 241 of the indexing unit 56 in position for the plunger 283 to be actuated to a closed position, by a deceleration dog 284 upon rotation of the control plate 253 on which the dog 284 is adjustably mounted.

The deceleration dog 284 is provided with an arcuate plunger contact surface 285 formed in a manner to progressively move the plunger 283 inwardly for the purpose of gradually reducing the flow of hydraulic pressure through the valve 280. The inlet port 281 of the deceleration valve 280 is hydraulically connected to receive the fluid discharge from the motor 244. Thus, as the motor 244 operates to rotate the table 20 in an indexing movement the fluid discharged from the motor 244 will be conducted to the inlet port of the deceleration valve 280 passing therethrough and out through the outlet port 282 to return to the reservoir. As the table 20 approaches an index position the control plate 253 rotatably driven by the motor 244 will be so positioned that the deceleration dog 284 will begin to actuate the plunger 283 of the deceleration valve 280, inwardly to gradually restrict the passage of fluid through the valve to thereby gradually reduce the rate at which the table 20 is being rotated. When the table 20 reaches the predetermined index position, the deceleration dog 284 will be positioned so as to move the plunger 283 of the valve inwardly to its limit of travel to terminate the flow of fluid through the valve and thereby stop the operation of the hydraulic motor 244 and the rotation of the table 20. As the deceleration dog 284 actuates the plunger 283 completely inwardly, a limit switch dog 288, adjustably mounted on the control plate 253, will actuate a limit switch 1LS to effect sequential operation of the positioning and clamping mechanism 60 as well as the auxiliary clamp mechanisms 201, 202, 203 and 204, as previously described.

A hydraulic circuit for operating the various components described above is shown diagrammatically in FIG. 8 and there shown comprises a pump 300 which is driven by a motor 301. The pump 300 is connected to draw hydraulic fluid from a reservoir 302. The output of the pump 300 is discharged into a pressure line 303 and a branch pressure line 304 with the exhaust fluid being carried back to the reservoir by exhaust lines 306, 307 and 308. An indexing cycle is initiated by an operator manually depressing an index start button 409, shown in FIG. 9, which when depressed effects energization of a solenoid 310 of a valve 311. With the solenoid 310 energized a plunger 312 of the valve 311 is positioned rightwardly within the valve, as shown in FIG. 8, to connect the pressure line 303 to a line 313 that communicates with a chamber 314 in the fluid actuator 190. Fluid pressure in the chamber 314 of the actuator 190 will effect its operation in a direction to cause the outwardly extending ends of the levers 70 and 160 to move upwardly thereby withdrawing the locating plunger 148 out of table registry and elevating the table 20 from the base to render it freely rotatably on the bearing 106 for an indexing movement.

As fluid pressure builds up in the chamber 314 of the actuator 190 fluid in the line 313 will flow into a connected line 315 and flow through a sequence valve 316 into a line 317 that is connected to the inlet port 318 of the hydraulic motor 244. Fluid pressure supplied to the inlet port 318 of the fluid motor 244 will cause it to operate to drive the table 20 in an indexing movement. The exhaust fluid from the motor 244 will flow from the outlet port 319 into a line 320 which communicates with the inlet port 281 of the deceleration valve 280. However, as shown in FIG. 8, in a previous indexing cycle, the deceleration dog 284 had been positioned to move the plunger 283 of the valve 280 inwardly to close the inlet port of the valve to block the flow of exhaust fluid therethrough. Thus, exhaust fluid in the line 320 will flow into a connected line 321 and through a check valve 322 into the return line 307. The check valve 322 is held open by oil trapped in a pilot line 323 which received fluid from the deceleration valve 280 when the valve 280 was previously opened. As the table 20 begins to rotate, the control plate 253 also begins to rotate thereby moving the deceleration dog 284 out of contact with the plunger 283 of the valve 280 to release the plunger 283 and open the inlet port 281. At this time the pilot oil in the pilot line 323 will be released and the check valve 322 will be closed thereby forcing fluid exhaust from the motor 244 to flow through the deceleration valve and return to the reservoir via the return line 308 connected into the return line 306.

When the index start switch 409 is manually actuated by the operator to energize the solenoid 310 of the valve 311, a solenoid 325 of a valve 326 is simultaneously energized to position a plunger 327 of the valve into a rightward position within the valve, as shown in FIG. 8. Thus, as fluid pressure is directed to the chamber 314 of the actuator 190 to effect axial movement of the plunger 148 out of registry with the table 20, fluid pressure in the branch pressure line 304 will also be supplied to a line 328 from whence it flows into a chamber 329 of the fluid actuator 200 of the auxiliary clamp 201 and into a chamber 330 of a fluid actuator 331 of the auxiliary clamp mechanism 202. The fluid pressure will also flow, by means of a connected branch line 334, into a chamber 335 of a fluid actuator 336 of the auxiliary clamp 203, and into a chamber 337 of a fluid actuator 338 of the clamp mechanism 204. On the other hand, when the plunger 148 is being withdrawn from table registry the auxiliary clamp mechanisms 201, 202, 203 and 204 are actuated to release the periphery of the table 21 from clamped engagement so that upon further upward movement of the extending end of the lever 70, the lever will operate to elevate the table.

As fluid pressure is supplied to the chambers 329, 330, 335 and 337 of the fluid actuators 200, 331, 336 and 338, respectively, fluid in a chamber 348 of the fluid actuator 200, and fluid in a chamber 349 of the actuator 331 will be exhausted from the respective chambers into a line 353. Simultaneously therewith, fluid in a chamber 351 of the actuator 336, and fluid in a chamber 352 of the fluid actuator 338 will be exhausted from the respective chambers into a line 354. The combined fluid exhaust from the lines 353 and 354 will flow through a connected line 355 which communicates with the reservoir 302 by means of a by-pass circuit comprising a line 356, connected into the line 355, a check valve 357 and a line 358 connected to the valve 326. The combined fluid discharge will flow through the valve into the branch return line 307 and by means of the connected return line 306 return to the reservoir 302.

As the index table 20 approaches an index position the control plate 253 will have been rotated so that the deceleration dog 284 thereon will begin to actuate the plunger 283 of the valve 280 inwardly to gradually restrict the flow of fluid exhaust from the motor 244 therethrough thereby slowing the rate of rotation of the table 20. When the table 20 has been rotated to an approximate index position, the control plate 253 will have been rotated so that the cam 284 is in a position to actuate the plunger 283 of the valve 280 to its full limit of inward travel closing the inlet port 281 of the valve and thereby blocking the further flow of fluid exhaust through the valve and stopping rotation of the table 20.

When the table has been rotated to an index position and the operation of the motor 244 stopped, the dog 288 on the control plate 253 will have been rotated to a position to actuate the limit switch 1LS. When the limit switch 1LS is actuated it operates to effect de-energization of the solenoid 310 of the valve 311 and also to effect de-energization of the solenoid 325 of the valve 326. Simultaneously with effecting de-energization of the solenoids 310 and 325 the limit switch 1LS will also operate to effect energization of a solenoid 361 of the valve 311 to effect a positioning of the plunger 312 of the valve 311 into a leftward position. With the solenoid 361 of the valve 311 energized, fluid pressure supplied to the chamber 314 of the fluid actuator 190 and to the fluid motor 244 will be interrupted and the fluid pressure in the line 303 will flow through the valve and into a connected line 362 that communicates with a chamber 363 of the fluid actuator 190 to effect operation of the actuator and operate the positioning and clamping mechanism 60 to move the locating plunger 148 axially upwardly into table registry to precisely position the table 20 in a desired index position and, also, to actuate the lever 70 in its pivotal movement for lowering the table 20 to the supporting base 21 and to clamp the table to the base.

Simultaneously with effecting energization of the solenoid 361 of the valve 311, the limit switch 1LS upon being actuated by the dog 288 will also operate to effect energization of a solenoid 366 of the valve 326 and thereby move the plunger 327 of the valve into a leftward position within the valve. With the solenoid 366 energized, fluid pressure in the branch supply line 304 will flow through the valve 326 into the line 358 and when the positioning and clamping mechanism 60 has operated to effect positioning and clamping of the table to the base, the fluid pressure in the line 358 will build up and flow through a sequence valve 367 and into the line 355 and by means of the branch lines 353 and 354 will enter into the chamber 348 of the clamp actuator 200, the chamber 349 of the actuator 331, and the chamber 351 of the actuator 336, and the chamber 352 of the actuator 338. Fluid pressure in the chambers 348, 349, 351 and 352 of the actuators 200, 331, 336 and 338, respectively, will effect simultaneous operation of the clamping mechanisms 201, 202, 203 and 204 into force applying engagement with the peripheral edge of the table 20 to effect a clamping of the peripheral edge of the table to the supporting surface 28 of the base 21.

When the clamp mechanisms 201, 202, 203 and 204 are operated to effect the clamping of the peripheral edge of the table to the base 21 fluid in the chambers 329 and 330 of the actuators 200 and 331, respectively, will be forced out of the chambers into the line 328. Also, fluid in the chambers 335 and 337 of the actuators 336 and 338, respectively, will be forced out of the chambers into the line 334 and will combine with the exhaust fluid in the line 328. The combined fluid exhaust in the line 328 will flow through the valve 326 into the return line 307 whence it will flow into the line 306 and be returned to the reservoir 302.

As the deceleration valve 280 is actuated to a closed condition by operation of the dog 284, fluid will be trapped in the pilot line 323 to actuate the check valve 322 to an open condition to thereby condition the system for the next cycle of operation. Since the limit switch 1LS will be actuated simultaneously with the closing of the deceleration valve 280 the valve 311 will be operated to effect leftward positioning of the plunger 312 so that fluid pressure to the line 313 will be discontinued at the same time that the deceleration valve is closed and the line 313 will be connected to the return line 306. Also, the line 320 will be connected to the return line 307 by means of the check valve 322 which is now held open by fluid trapped in the pilot line 323. As a result, the inlet and outlet sides of the motor 244 are connected to exhaust lines and the motor cannot now offer any resistance to the rotation of the table 20 in either direction. Therefore, the plunger 148 in operating to effect precise positioning of the table 20 will not be opposed by the motor 244.

As the table 20 is lowered to the base by operation of the lever 70, a limit switch 2LS, shown in FIG. 2 and schematically in FIG. 8, will be actuated indicating a completion of the indexing cycle and, also, to condition the electrical circuit, to be described, for another cycle of operation. It is to be noted that after an indexing cycle of operation has been completed the solenoids 361 and 366, of the valves 311 and 326, respectively, are maintained energized to insure positive operation of the various components in effecting positioning and clamping of the table.

The electrical control circuit for controlling the operation of the machine is shown in the wiring diagram illustrated in FIG. 9. Each of the electrical components is shown in the wiring diagram as connected across a pair of alternating current power lines AC–1 and AC–2 in one of a plurality of reference lines that are connected across the power lines with each of these lines being identified successively by the numerals L1 to L15, inclusive, so that the components may be readily located in the diagram. The contacts of the various relays are identified by the same reference numerals and letters as their associated relay coil with a numeral suffix added for the purpose of distinguishing each individual contact from the others.

The power lines AC–1 and AC–2 are energized by closing a manually operated master switch 403 which is shown on line L1 in FIG. 9. Closing of the switch 403 operates to energize the coil of a master relay CRM which has two normally open contacts CRM–1 and CRM–2 that are connected in the power lines AC–1 and AC–2. Energization of the master relay CRM causes the closing of its associated contacts CRM–1 and CRM–2 to energize the power lines. Energization of the relay CRM also closes a normally open contact CRM–3 in line L2 to establish a holding circuit for maintaining the relay CRM energized when the switch 403 is released. The power lines AC–1 and AC–2 are de-energized by actuating a stop switch 404 to break the circuit to the master relay CRM. With the power lines AC–1 and AC–2 energized the pump motor 301 may be energized by closing a pump motor start switch 406, shown on line L3. Closing of the switch 406 operates to energize the coil of a motor relay 1M to effect energization of the pump motor 301 to thereby operate the pump 300. Energization of the motor relay 1M also closes a normally open contact 1M–1, shown in line L4, to establish a holding circuit for maintaining the motor relay 1M energized when the switch 406 is released. The pump motor 301 may be de-energized by actuating a stop switch 407 to break the circuit to the motor relay 1M.

When an indexing cycle is initiated the positioning and clamping mechanism 60 is conditioned so that the plunger 148 is in registration with an opening in the table 20 and the lever 70 is applying a force upon the table to clamp it to the base 21, the auxiliary clamp mechanisms 201, 202, 203 and 204 are actuated to apply clamping forces to the peripheral edge of the table and the relay 3CR is energized, as will be later described, while the dog 288 will be positioned to actuate the limit switch 1LS. With the limit switch 1LS actuated, a normally closed contact 411, shown in line L7 in FIG. 9, associated with the limit switch is held open and a normally open contact 412, shown in line L9, is held closed. Thus, as shown in the wiring diagram illustrated in FIG. 9, with the normally open contact 412 of the limit switch 1LS held closed a holding circuit for maintaining the coil of the relay 3CR energized, shown in line L9, is established through a normally closed contact 1CR–4, shown in line L10, of a de-energized relay 1CR, shown in L5, and a now closed contact 3CR–2, in line L10, of the previously energized relay 3CR. In maintaining the relay 3CR energized, a pair of associated contacts 3CR–3 and 3CR–4, shown in line L14, are maintained closed, which operate to establish a circuit to the solenoids 361 and 366 of the valves 311 and 326, respectively, to energize them and thereby positively maintain the plunger of the associated valves in a condition for directing fluid pressure to the actuator 190 to maintain table positioning and clamping mechanism 60 actuated in table positioning and clamping operation, and to the actuators 200, 331, 336 and 338 to positively maintain the auxiliary clamping mechanisms 201, 202, 203 and 204 in force applying engagement with the peripheral edge of the table 20.

With the above conditions established, initiating an indexing cycle will be effected by the operator manually actuating the index start switch 409, shown in line L5. Manual actuation of the switch 409 operates to establish a circuit to the coil of a relay 1CR, shown in line L5, through a normally closed contact 2CR–1 of a de-energized relay 2CR. The circuit thus established will energize the relay 1CR which causes a contact 1CR–3 thereof, shown in line L6, to close, establishing a holding circuit for maintaining the relay 1CR energized when the index start switch 409 is released. When the relay 1CR is energized an associated contact 1CR–4, shown in line L10, is caused to open thereby interrupting the holding circuit to the relay 3CR and de-energizing the relay. De-energization of the relay 3CR will cause an associated contact 3CR–1, shown in line L6, to close thereby establishing a secondary holding circuit around the normally closed contact 2CR–1 of the de-energized relay 2CR, shown in line L7, for maintaining the relay 1CR energized whenever the relay 2CR is energized. When the relay 3CR is de-energized the associated contacts 3CR–3 and 3CR–4, in line L14, open to de-energize the solenoids 361 and 366 of the valves 311 and 326, respectively. Simultaneously upon the opening of the contacts 3CR–3 and 3CR–4, to effect de-energization of the solenoids 361 and 366, a pair of contacts 1CR–1 and 1CR–2, shown in line L13, associated with the now energized relay 1CR are closed to establish a circuit to the solenoids 310 and 325 of the valves 311 and 325, respectively, to effect energization of the solenoids. With the solenoids 310 and 325 energized fluid pressure will be directed to the actuator 190 to effect its operation in a direction to actuate the positioning and clamping mechanism 60 in a table release and elevating action; also fluid pressure will be directed to the actuators 200, 331, 336 and 338 to effect their operation in a direction to actuate the auxiliary clamp mechanisms 201, 202, 203 and 204 in a releasing action to free the peripheral edge of the table. When the positioning and clamping mechanism 60 has been actuated to fully elevate the table 20 relative to the base 21 fluid pressure will be supplied to the fluid motor 244, as previously described, to effect its operation for driving the table 20 in an indexing movement.

When the table 20 has been elevated the limit switch 2LS is released to its normal open condition which operates to maintain a timer relay TR, shown in line L11, de-energized until such time as the table shall once again be precisely positioned in an index position.

As the table 20 begins to rotate in an indexing movement the control plate 253 will also begin to rotate thereby moving the dog 288 out of engagement with the limit switch 1LS. The limit switch 1LS upon being released operates to cause its associated contact 411, in line L7, to return to its normally closed condition and thereby cause the contact 412, in line L9, to open. With the contact 411 of the limit switch 1LS closed a circuit to the coil of the relay 2CR is established to energize the relay. Energization of the relay 2CR causes an associated contact 2CR–1, shown in line L5, to open but the relay 1CR is maintained energized through a holding circuit established through a contact 1CR–3 and a contact 3CR–1 of the de-energized relay 3CR.

Energization of the relay 2CR also operates to close an associated contact 2CR–2, shown in line L8, to establish a holding circuit for maintaining the relay 2CR energized when the normally closed contact 411 of the limit switch 1LS is moved to an open condition. Another contact 2CR–3, shown in line L9, of the now energized relay 2CR is closed to condition the line L9 for subsequent operation of the relay 3CR. Similarly, another contact 2CR–4, shown in line L11, of the now energized relay 2CR is closed to condition the line L11 for the subsequent energization of the timer relay TR.

When the table 20 has been rotated to an index position the dog 288 on the control plate 253 will be again positioned to actuate the limit switch 1LS. This action opens the normally closed contact 411 of the limit switch which normally would effect de-energization of the relay 2CR. However, the relay 2CR is maintained energized by the holding circuit established through the now closed contact 2CR–2 of the relay. Actuation of the limit switch 1LS by the dog 288 also operates to close the normally open contact 412 thereby establishing a circuit to the coil of the relay 3CR, through the now closed contact 2CR–3 of the energized relay 2CR, to effect its energization. As the relay 3CR is energized the contact 3CR–1, in line L6, is opened interrupting the holding circuit around the contact 2CR–1, in line L5, thereby effecting de-energization of the relay 1CR. When the relay 1CR is de-energized its contact 1CR4, in line L10, is closed establishing a holding circuit for the relay 3CR around the contact 2CR–3, in line L9. Also, when the relay 1CR is de-energized the pair of associated contacts 1CR–1 and 1CR–2, in line L13, are opened to thereby de-energize the solenoids 310 and 325 of the valves 311 and 326, respectively. With the solenoids 310 and 325 of the valves 311 and 326, respectively, de-energized, and with the relay 3CR energized a pair of associated contacts 3CR–3 and 3CR–4, in line L14, are closed thereby establishing a circuit to the solenoids 361 and 366 of the respective valves 311 and 326 to condition them for directing fluid pressure to the actuator 190 to operate the positioning and clamping mechanism 60 in a table positioning and clamping action and also to effect operation of the auxiliary clamping mechanisms 201, 202, 203 and 204 into force applying engagement with the edge of the table 20.

As the table 20 is lowered to the base 21 the limit switch 2LS will be actuated to a closed condition thereby completing the circuit to the coil of the timer relay TR through the contact 2CR–4 to energize the timer relay. When the timer relay TR operates its associated contact, shown in line L7, it will open, after a time interval, and interrupt the circuit to the coil of the relay 2CR to de-energize it. This conditions the electrical circuit for a subsequent indexing cycle.

The relay 3CR is now maintained energized through the holding circuit established through the closed contact 1CR–4 of the de-energized relay 1CR and an associated, now closed contact 3CR–2 of the energized relay 3CR. Thus, the solenoids 361 and 366 of the valves 311 and 326, respectively, are maintained energized until initiation of the next index cycle.

From the foregoing detailed description of the illustrative embodiment set forth herein to exemplify the present invention, it will be apparent that there has been provided an improved machine tool incorporating the mechanical table positioning and clamping mechanism and having auxiliary clamping mechanisms for preventing deflection of the peripheral edge of the table during a work operation. The positioning and clamping mechanism provided is extremely simple in construction and easily disassembled and assembled and very economical to manufacture. The indexing drive mechanism provided is also extremely simple in construction but efficient in operation and may be utilized with the control system provided to effect an indexing movement of the table to as many index stations as desired.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a rotary table assembly; a base; a table supported on said base for rotational and axial movement relative to it; positioning means for angularly locating said table relative to said base; means operably connected to said table for effecting axial movement of said table relative to said base; coupling means positively and operably connecting said positioning means and said means for effecting axial movement of said table together for simultaneous reversible operation; whereby as said means for effecting axial movement of said table is operated in one direction to raise said table relative to said base said positioning means is actuated to a disengaged position to render said table freely rotatable and as said means for effecting axial movement of said table is operated in another direction to lower said table relative to said base said positioning means is actuated to an engaged position to lock said table against rotation.

2. In a rotary table assembly; a base; a table supported on said base for rotational and axial movement and having a plurality of openings therein; a first means in said base for moving said table axially relative to said base; a plunger supported in said base for movement into and out of registry with the openings in said table individually; a second means in said base operably connected to effect axial movement of said plunger; means positively connecting said first and said second means together so that they operate simultaneously in one direction to elevate said table from said base and to withdraw said plunger out of an opening in said table to thereby render said table freely rotatable relative to said base, said first and second means being operable when actuated simultaneously in the opposite direction to move said plunger axially into engagement with an opening in said table to effect precise angular positioning of said table relative to said base and to lower said table to said base, said second means including means to clamp the table to the base in the precise relative positions thereof as established by said plunger; and reversible power means operably connected to effect simultaneous movement of said first and second means in one direction or the other.

3. In a rotary table assembly; a base; a table on said base for rotational and axial movement relative to said base, said table being provided with a plurality of spaced openings; a plunger movably supported in said base in position to be selectively engageable in the openings in said table individually for locating said table in a desired index position; a system of interconnected levers supported in said base and operably connected to said table and said plunger, said lever system being operable when actuated to move said plunger into registry with an opening in said table to thereby effect precise positioning of said table and to lower said table to said base and to exert a force upon said table to clamp said table to said base in the position as established by said plunger; power means carried by said base and operably connected to said lever system to actuate it in a positioning and clamping operation; a plurality of clamping mechanisms carried by said base in position to exert a force upon the edge of said table to effect a clamping of the edge of said table to said base; power actuators connected to actuate said clamping mechanisms; and means for controlling the operation of said power means and said power actuators for operation thereof in timed coordination.

4. In a rotary work supporting table assembly; a base; a table rotatably supported on said base and movable axially relative to said base; a radial bearing interposed between said table and said base to restrain said table from lateral movement relative to said base while permitting said table to rotate relative to said base; a thrust bearing in engagement with the underside of said table; a lever movably mounted within said base; force transmitting means between said lever and said thrust bearing to raise said thrust bearing and said table axially to move the latter off of said base while retaining said radial bearing in engagement when the lever is moved upwardly so that said table is supported on said thrust bearing and is restrained from lateral movement by said radial bearing; means responsive to downward movement of said lever to clamp the table to said base; and means actuatable to rotate said table while said table is raised off of said base by the operation of said lever.

5. In a rotary work supporting table assembly; a base; a table rotatably supported on said base and movable axially relative to said base, said table having a plurality of openings; a radial bearing interposed between said table and said base to restrain said table from lateral movement relative to said base while permitting said table to rotate relative to said base; a thrust bearing in engagement with the underside of said table; a lever pivotably mounted within said base in position to engage said thrust bearing when pivoted upwardly to raise said thrust bearing and said table axially to move the latter off of said base while retaining said radial bearing in engagement so that said table is supported on said thrust bearing for rotational movement and is restrained from lateral movement by said radial bearing; a plunger carried by said base for axial movement in position to be moved into the openings in said table individually for precisely locating said table at predetermined index positions; plunger actuating means operably connected to operate concurrently with said lever to move said plunger into engagement with one of the openings in said table while said lever is pivoting in a direction to lower said table onto said base, said plunger actuating means also operating concurrently with said lever to withdraw said plunger from engagement with one of the openings in said table while said lever is pivoting in a direction to raise said table off of said base to render said table fully rotatable on said thrust bearing; and means actuatable to rotate said table while said table is raised off of said base.

6. In a rotary table assembly; a base; a table supported on said base for rotational and axial movement relative to it and having a plurality of openings therein; a drive transmission operably connected to rotate said table in an indexing movement; a lever pivotally supported in said base; force transmitting means operably connecting said lever and said table to effect axial movement of said table, said lever being operable when pivoted in one direction to elevate said table off of said base to free said table from said base for rotational movement in an indexing movement, said lever also being operable when pivoted in the opposite direction to effect a lowering of said table to said base, said force transmitting means including means to effect a clamping of said table to said base pursuant to pivotal movement of said lever in the opposite direction; a plunger selectively movable into and out of engagement with the openings in said table individually for locating said table in a desired angular position relative to said base; means connecting said plunger to said lever to be actuated thereby into and out of engagement with an opening in said table, the arrangement being such that when said lever is moved in one direction to elevate said table from said base said plunger is actuated thereby in a direction to withdraw it out of engagement from an opening in the table prior to the full elevation of said table, or when said lever is moved in the opposite direction to effect a lowering of said table to said base and to clamp it thereto said plunger is concurrently actuated into engagement with an opening in said table prior to the clamping of the table to said base; and reversible power means operably connected to actuate said lever in either direction.

7. In a rotary table assembly for a machine tool; a base; a table mounted on said base for rotational and axial movement and having a plurality of openings; a first lever pivotally supported in said base; force transmitting means coupling said lever to said table to effect its axial movement; a plunger supported in said base for axial movement and disposed in a position to be engageable in the openings in said table individually; a second lever pivotally supported in said base and coupled to said plunger and said first lever in a manner that initial movement of said first lever in one direction will operate to effect axial movement of said table toward said base and to concurrently actuate said second lever in a direction to move said plunger axially into registry with an opening in said table, said force transmitting means comprising means pursuant to which continued movement of said first lever in the same direction will operate to move said table into engagement with said base and to clamp said table to said base, said first lever also being operable when actuated in the opposite direction to effect a release of said table from clamped engagement with said base and continued movement of said first lever in the opposite direction will actuate said second lever in a direction to effect withdrawal of said plunger from registration with an opening in said table and will also raise said table from said base to render it freely rotatable relative to said base; and reversible power means operably connected to actuate said first lever in either direction; whereby said plunger, when actuated into registry with an opening in said table, will operate to precisely locate said table angularly relative to said base while it is in a raised position off of said base, and after said plunger has registered in an opening in said table, said table will be lowered to said supporting base and clamped to it in a precise position as established by said plunger.

8. In a rotary work supporting table assembly for a machine tool; a work supporting table supported on said base for rotational and axial movement relative to it, said table being provided with a plurality of openings; a plunger supported in said base and disposed therein to be moved axially into engagement with an individual one of the openings in said table to effect precise positioning of said table relative to said base; a first lever pivotally supported in said base beneath said table and coupled to said table on one side of its fulcrum; a second lever pivotally supported in said base and coupled to said plunger on one side of its fulcrum; connecting means operably connected to said second lever on the opposite side of its fulcrum but at a distance from its fulcrum which is less than the distance between its fulcrum and the coupling of said plunger thereto, said connecting means also being connected to said first lever at a point further from its fulcrum than the point of coupling of said first lever with said table and on the same side of its fulcrum; a reversible fluid actuator operably connected to said first lever to effect its operation in either direction; and drive means operably connected to effect rotation of said table in an indexing movement; whereby said fluid actuator may be operated to effect pivotal movement of said first lever in one direction and said first lever upon moving will pivot said second lever in a direction to move said plunger out of registry with an opening in said table and continued pivotal movement of said first lever will effect axial movement of said table to raise it from said base to render it freely rotatable relative to said base and said drive means may be operated to rotate said elevated table in an indexing movement, and said fluid actuator may be operated in the opposite direction to pivot said first lever in a second direction and said first lever upon pivoting in the second direction will concurrently pivot said second lever in a direction to register said plunger in an opening in said table to effect precise positioning of said table relative to said base and thereafter said first lever will operate to effect axial movement of said table to lower it to said base and exert a force on said table to clamp it to said base in the precise position as established by said plunger.

9. In a rotary table assembly; a base; a table mounted on said base for rotational and axial movement relative to it, said table being provided with a plurality of spaced openings; a plunger supported in said base for axial movement and disposed so as to be selectively engageable in the openings in said table individually; a first lever disposed within said base and having one end pivotally connected therein, said first lever being coupled to said table in a manner so that movement of said first lever in a first direction will operate to move said table axially to raise it off of said base to render said table freely rotatable relative to said base, and when said table is in a raised position relative to said base operation of said first lever in a second direction will operate to effect axial movement of said table to lower said table to said base and to clamp it to said base; a second lever pivotally supported in said base, said second lever having a first arm on one side of its fulcrum with the extending end thereof being coupled to said plunger, said second lever having a second arm on the opposite side of its fulcrum, said second arm being shorter than said first arm; means operable to couple the end of said second arm of said second lever with the free end of said first lever, the arrangement being such that as the free end of said first lever is moved in a first direction it will operate to effect axial movement of said table to raise said table relative to said base a distance less than the distance that the free end of said first lever moves in the first direction, and as the free end of said first lever is moving it will effect a like movement of the end of said second arm of said second lever the same amount and in the same direction to cause the end of said first arm of said second lever that is connected to said plunger to move in the opposite direction and in an amount greater than the amount that the end of said second arm moves and the end of said first arm of said second lever, in moving in the opposite direction, will effect axial movement of said plunger in the same direction and in the same amount to effect withdrawal of said plunger out of registry with an opening in said table, and continued movement of the free end of said first lever in the first direction will operate to raise said table relative to said base an additional amount to render it freely rotatable relative to said base, and operation of said first lever in a reverse operational movement will operate to effect axial movement of said table downwardly and will also concurrently actuate said second lever to move said plunger upwardly into registry with an opening in said table before said table is moved downwardly onto said base, and continued movement of said first lever will operate to lower said table to said base and exert a force on said table to clamp it to said base; and a reversible power means operably connected to the free end of said first lever to actuate it in either direction selectively.

10. In a rotary table assembly for a machine tool; a base; a table supported on said base for rotational and axial movement relative to said base and having a plurality of openings therein; a first lever carried within said base and having its inwardly extending end pivotably connected to a fulcrum about which said lever is pivotably movable; means operably connecting one side of said lever to said table in a manner that as the outwardly extending end of said first lever moves in one direction said table will be caused to move in the same direction but in a lesser amount; a second lever carried by said base for pivotable movement, said second lever having a relatively long arm on one side of its fulcrum extending inwardly into said base, said second lever also being provided with a second arm which extends outwardly of said base from the opposite side of its fulcrum; a table positioning plunger supported in said base for axial movement in position to be selectively engageable in the openings provided in said table individually to effect precise positioning of said table relative to said base while said table is supported in an elevated position relative to said base; means connecting the end of said relatively long arm of said second lever to said plunger; means connecting the extending end of said first lever with the extending end of said relatively short arm of said second lever in a manner so that as the extending end of said first lever moves in one direction it will cause like movement of said relatively short arm of said second lever and said second arm in moving with said first lever will cause the relatively long arm of said second lever to move in the opposite direction and in a greater amount to thereby effect movement of said plunger in the same direction and in the same amount as the relatively long arm of said second lever is moved; a fluid actuator connected to the extending end of said first lever to effect its movement and thereby movement of said second lever; a plurality of auxiliary clamp mechanisms disposed about the periphery of said base in position to exert a force upon the peripheral edge of said table to effect a clamping of the edge of said table to said base; fluid actuators for each of said auxiliary clamp mechanisms operably connected to the individual associated clamp mechanism to effect their operation in a clamping or unclamping action; and a source of fluid pressure connected to the fluid actuator of said first lever and to the individual fluid actuators of said auxiliary clamp mechanism to energize them for operation in either direction.

11. The combination with a rotary table having an axle shaft and a base having a bearing in which said axle shaft is axially shiftable; of means for transmitting axial thrust to said shaft and comprising spaced thrust rings on said shaft; a lever having a portion disposed between said thrust rings; a pedestal about said bearing and having radial openings in substantial alignment with the space between said thrust rings and through which said lever extends; a fulcrum for said lever radially offset from the axis of said shaft; and a power operator for said lever radially offset from said shaft.

12. The combination with a rotary table having an axle shaft and a base having a bearing in which said axle shaft is axially shiftable; of means for transmitting axial thrust to said shaft and comprising spaced thrust rings on said shaft; a lever having a portion disposed between said thrust rings; a pedestal about said bearing and having radial openings in substantial alignment with the space between said thrust rings and through which said lever extends; a fulcrum for said lever radially offset from the axis of said shaft and comprising a pintle seated in said pedestal and spanning across one of said radial openings, said lever having a forked bearing opening through one end of the lever and oscillatable on said pintle; and a power operator for said lever radially offset from said shaft.

13. An indexable work supporting table having a depending center post provided with spaced apart thrust members, a table base provided with a central bored opening larger in diameter than said thrust members, said base being provided with a radial bearing concentric with the bored opening formed therein adapted to guide said table for both rotatable and axial movement, said base presenting a way clamp surface positioned to positively engage said table, a pivot shaft carried by said base in perpendicular laterally spaced relationship to the depending center post of said table, a laterally insertable lever provided with spaced apart arms respectively engageable between the thrust members secured to said depending center post, said spaced apart lever arms being provided with bifurcated ends respectively disposed to engage said pivot shaft, means secured to said base operative to constrain said lever for pivotable movement about said pivot shaft, and reversible actuating means connected to urge said lever in one direction to move said table away from said base for indexing, said actuating means being reversibly operative to urge said table into clamping engagement with the way clamp surface presented by said base.

14. In a rotary table clamping mechanism, a base presenting a clamping way surface, said base being provided with a central bored opening, a rotary table having a depending center post removably insertable through the bored opening in said base, a pair of spaced apart thrust members secured to said center post to constitute an enlarged annular groove and being movable with said center post through the bored opening in said base, a pivot shaft carried by said base in laterally spaced perpendicular relationship to said center post, a lever engaging the annular groove provided by said thrust members and having a bifurcated end engaging said pivot shaft, first power operable means connected to move said lever in one direction for elevating said table to facilitate indexable movement, said first power operable means being reversibly actuatable to urge said table into clamped engagement with the clamping way surface presented by said base, a plurality of spaced apart auxiliary clamps releasably engageable with said table for urging it into clamped engagement with said table clamping way, and a plurality of auxiliary power actuators respectively connected to actuate said auxiliary clamps in coordinated relationship with said first power operable means.

15. In a rotary table index and clamp mechanism, a base presenting an upper clamp way and a pair of axially spaced apart concentrically formed bored openings positioned in perpendicular relationship to the clamp way and being separated by a laterally extending opening, an indexable rotary table having a depending center post engageable with the axially spaced bored openings in said base, said table being guided by said base for both rotatable and axial movement relative to the clamp way presented thereby, a pivot shaft carried by said base in laterally spaced relationship to the axially spaced bored openings formed therein, a lever having a pair of spaced arms insertable through the laterally extending opening between the spaced apart bored openings in said base to engage the periphery of said depending center post, said lever arms having bifurcated ends engaging said pivot shaft, a pair of thrust members secured to said center post in a manner to be respectively engaged by the arms of said lever, power actuated means connected to pivot said lever in one direction for urging said table into clamped engagement with the clamp way presented by said base, and means to reverse said power means.

16. In an indexable work support for a machine tool, a base presenting a clamp way and a bored opening perpendicular thereto, a rotary table provided with a depending center post presenting an enlarged annular groove defined by thrust faces, said table being removably positionable upon said base with the center post extending through the bored opening formed therein, a pivot shaft carried by said base in laterally spaced relationship to the bored opening formed therein, a lever provided with forked arms engaging the enlarged annular groove presented by said center post, said lever arms being provided with bifurcated inner ends engaging said pivot shaft, means carried by said base connected to retain said lever in pivotable engagement with said pivot shaft, and power operable means connected to move said lever in one direction for disengaging said table from the clamp way, said power operable means being reversibly operative for urging said table into clamped engagement with the clamp way presented by said base.

17. In a clamping mechanism for an indexable machine tool work support, a base presenting a clamping way, said base being provided with a central bored opening, a work support having a depending center post removably insertable through the bored opening in said base, a pair of spaced apart thrust members secured to said center post to constitute an enlarged annular groove and being movable with said center post through the bored opening in said base, a pivot shaft carried by said base in laterally spaced perpendicular relationship to said depending center post, a lever engaging the annular groove provided by said thrust members and having a bifurcated end engaging said pivot shaft, and power operable means connected to move said lever in one direction for moving said work support axially outward to facilitate indexable movement, said power operable means being reversibly actuatable to urge said work support into clamped engagement with the clamping way presented by said base.

References Cited in the file of this patent

UNITED STATES PATENTS

| | | |
|---|---|---|
| 1,968,990 | Carlson | Aug. 7, 1934 |
| 2,554,562 | Dath | May 29, 1951 |